United States Patent
Lautenbach-Lampe et al.

(10) Patent No.: US 6,279,120 B1
(45) Date of Patent: Aug. 21, 2001

(54) METHOD FOR STORING COMPUTER STATUS DATA GIVEN A MALFUNCTION THAT REQUIRES A SUBSEQUENT RESTARTING OF THE COMPUTER

(75) Inventors: Dagmar Lautenbach-Lampe; Horst Ripken; Franz Schroeder, all of Munich; Zbigniew Gulbicki, Germering; Petro Istavrinos, Unterhaching, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/123,219

(22) Filed: Jul. 27, 1998

(30) Foreign Application Priority Data

Jul. 25, 1997 (EP) .................................. 97112883

(51) Int. Cl.[7] ................................... G06F 11/00
(52) U.S. Cl. .............................. 714/15; 714/25
(58) Field of Search ................. 714/15, 25, 40

(56) References Cited

U.S. PATENT DOCUMENTS

| | | | | |
|---|---|---|---|---|
| 4,740,969 | * | 4/1988 | Fremont | 714/15 |
| 4,979,143 | | 12/1990 | Takano et al. | |
| 5,034,915 | * | 7/1991 | Styrna | 714/14 |
| 5,151,987 | * | 9/1992 | Abraham | 714/20 |

FOREIGN PATENT DOCUMENTS

| | | |
|---|---|---|
| 196 15 644 A1 | 2/1997 | (DE) . |
| 0 376 488 A2 | 7/1990 | (EP) . |
| 0050006295 AA | 1/1993 | (JP) . |
| 0090054700 AA | 2/1997 | (JP) . |

OTHER PUBLICATIONS

IBM Technical Disclosure Bulletin "Intelligent Dump for I/O Processor" Apr. 1, 1993; vol. 36, issue 4, pp. 349–352.*

* cited by examiner

*Primary Examiner*—Robert Beausoleil
*Assistant Examiner*—Bryce Bonzo
(74) *Attorney, Agent, or Firm*—Schiff Hardin & Waite

(57) ABSTRACT

The method stores data characteristic of the status of a computer given a malfunction that requires a subsequent restart of the computer. The computer status data is thereby continuously stored in the main memory of the computer and is read out therefrom and transferred onto a data carrier before the formatting of the main memory given the restart of the computer after the malfunction. A securing of the computer status data for error analysis and elimination can also be achieved with the inventive method given an immediate restart of the computer, so that the method can also be utilized in fail-safe systems with automatic start-up, for example in communication switching systems.

15 Claims, 4 Drawing Sheets

FIG. 1

| Computer Status Data | Size | Location | Destroyed in | Explanation |
|---|---|---|---|---|
| Area to be secured for software error handling | 100 kB | MP-SA, MP-D | Startup Stage "LOADREC3" | Contains all communicated software error processes not yet permanently stored in a data file |
| Error indices in function check | 22 kB | MP-SA, MP-D | Startup Stage "LOADREC3" | data representing detection of an error, which lead to a direct startup without calling a software error handling |
| Restart data | 241 kB | MP-SA, MP-D | Startup Stage "LOADREC3" | all data not yet stored in a security data file, and information outputted for startup end masks |
| Administration data | ca. 4 kB | MP-SA | Startup Stage "LOADREC3" | all items of monitoring information not yet stored in a data file |
| History of the software error handling | ca. 5 kB | MP-SA | Startup Stage "LOADREC3" | information concerning software error processing requests, e.g., from defective units or relating to the startup stage |
| Communication area | ca. 15 kB | | Startup Stage "LOADREC3" | (Checksum area is not secured) |
| Startup requirements | | MP-SA, MP-D | | Resets requested by hardware or software |
| Startup stages | | MP-SA, MP-D | | Startup stage requested or executed by control software |
| Software error registration | | MP-SA, MP-D | | Current parameters of called software error handling report routines |
| Hardware error registration | | MP-SA, MP-D | | Diagnostic results concerning computing unit and hard disk |
| Startup information | | MP-SA, MP-D | | Information concerning execution of the current startup |
| Boot stages registration | | MP-SA, MP-D | | Boot stage information |
| Symptom data recording | 500 kB | MP-SA, MP-D | Startup Stage "LOADREC3" | All symptom data not yet stored in a security file |

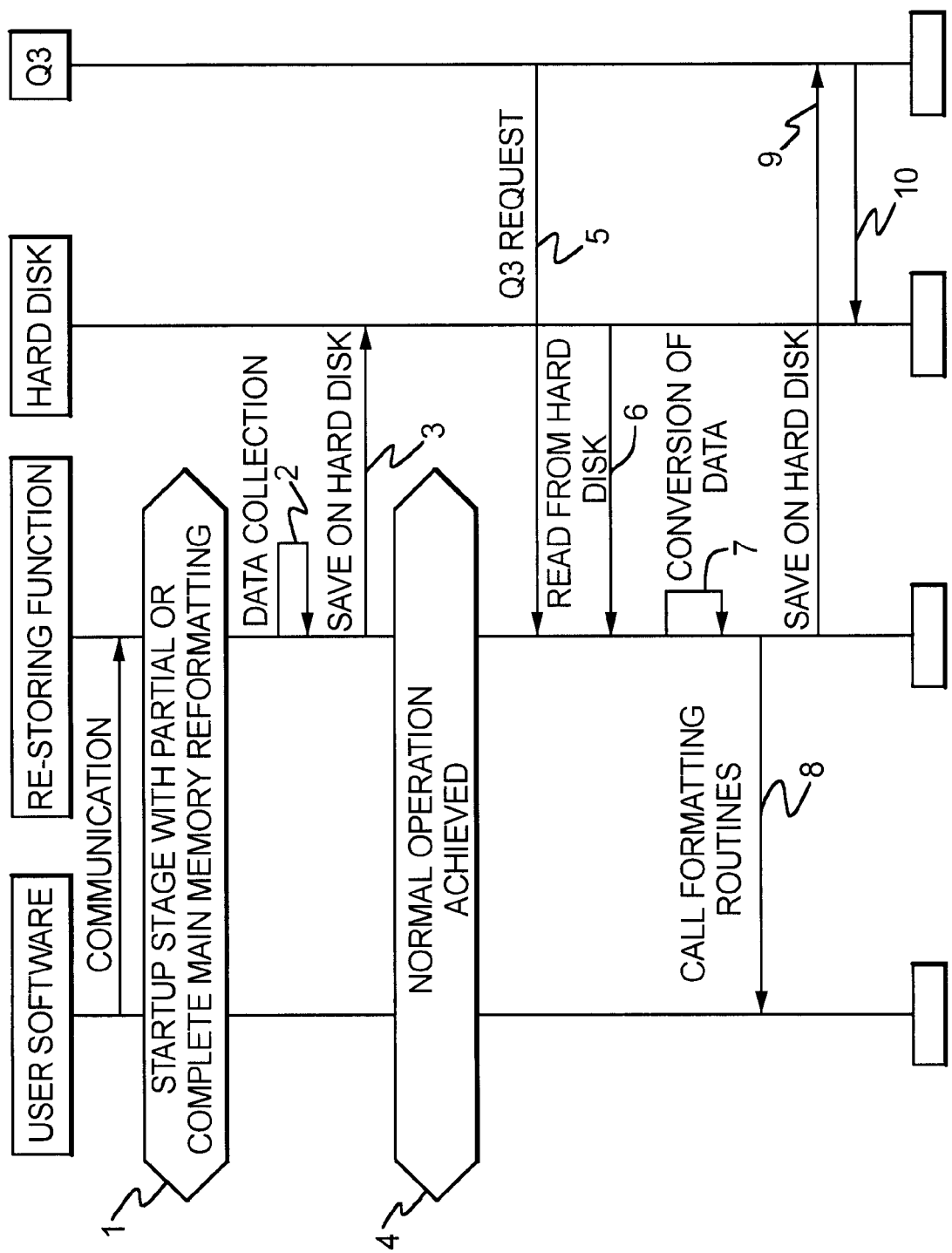

METHOD FOR STORING COMPUTER STATUS DATA GIVEN A MALFUNCTION THAT REQUIRES A SUBSEQUENT RESTARTING OF THE COMPUTER

BACKGROUND OF THE INVENTION

The present invention is directed to a method for storing data describing the status of a computer given a serious malfunction, the data being subsequently utilized for error analysis and, potentially, elimination thereof. Such serious malfunctions can be the result of, for example, by software or hardware errors and then prevent continued normal operation or, respectively, can also potentially lead to an overall computer crash. In general, no status data is available that represents the computer status immediately before and during the malfunction. The possibility of localizing the cause of the crash and the error is therefore generally lacking.

In addition some computer units must be constantly available in real-time operation, for example given digital telephone switching systems. After a crash, such a computer is normally immediately automatically restarted, whereby the main memory is also partially reformatted. Another problem is also that no possibility for error searching remains due to the immediate restarting of the computer. It is therefore extremely difficult to analyze and eliminate the cause of the crash, that is, hardware or software errors.

For providing computer status information immediately before a serious malfunction, the computer status during normal operation must be constantly logged in order to be able to analyze the cause of the error after a serious malfunction. For dynamic reasons, however, such data cannot be immediately externally secured, for example on a hard disk, since the performance of the computer would be too degraded. Such data would apt to be secured periodically or when a specific volume is reached, that is, at greater time intervals. Given the occurrence of a serious malfunction that leads to a restart of the computer, however, the main memory is then also often reformatted, so that the status information is overwritten. However, the status information for the critical time span, namely for the time span between the last securing time and the time of the malfunction, is lacking, so that the error analysis can only be based on incomplete data material.

SUMMARY OF THE INVENTION

It is an object of the present invention, based on the object of offering a method for effective storing of computer status information enabling a good error analysis given a malfunction.

In the inventive method information about the status of the computer (computer status data) is constantly collected in the main memory. This information represents relative information from program units that are respectively being processed or are running at the moment and it may also represent information about the status of hardware units, particularly of hardware components that generate error signals. An information area is thus always available in the main memory that can be immediately evaluated given a less serious malfunction that does not require a restart of the computer or can be evaluated at a suitable point in time in order to analyze and purge errors in the software and/or hardware components.

When, however, a serious malfunction occurs that requires a restart of the computer with complete or partial formatting of the main memory, this computer status data in the main memory would be overwritten, so that the information is lost and no longer enable an error analysis. For solving this problem, an additional program section is provided in the inventive method that effects a re-storing of the computer status data from the main memory onto a different data carrier, for example, onto a hard disk. This re-storing is implemented in the starting phase of the booting before the formatting of the main memory and, in particular, before the loading of the operating system, that is in a condition wherein the main memory content and, thus, the computer status data are still unmodified. This computer status data is thus consequently still available after the startup of the computer for an immediate or for a later error analysis that can be implemented internally or externally. Since the computer status data continues to be written immediately up to the occurrence of the malfunction, it also contains the current information that allow the best possible error analysis.

In an embodiment of the present invention, the memory areas of the main memory in which the computer status data is stored and that thus forms a data collection table is communicated to a central re-storing function, particularly by transferring the main memory address and the length of the memory area. The re-storing function is thereby designed such that it can also work without operating system support since the operating system can likewise be possibly faulty or, respectively, effect a falsified data base organization. The re-storing function is therefore preferably realized in software terms as an autonomous section in the lowest software levels under the operating system. The re-storing function is preferably resident in the boot level, that is, lies in the "boot strap software". When a serious malfunction occurs, the boot strap phase is run as a reaction, so that the re-storing function is initiated and reads the computer status data from the main memory area of which it has been informed and outputs the data via an elementary input/output interface to an external data carrier. This procedure can sequence optimally within a few seconds in terms of time, so that the corresponding data areas can be very quickly compactly transferred and the transport sequence is immediate, that is, without further system overhead.

Theoretically, it could also be considered to bracket-out the main memory areas containing the computer status data in the memory reformatting in order to prevent an overwriting of this data. However, the problem avoided with the present invention could thereby derive, namely that given potential falsifications of this data caused by system errors, the computer would again work incorrectly upon startup due to this falsified, main memory data contents and would potentially crash again.

As a result of the present inventive procedure, the computer status data memory areas of the main memory can also be reformatted after the transfer, so that potentially existing data falsifications in the memory areas are neutralized.

Over and above this, a reformatting of the entire main memory is unavoidable given serious malfunctions, whereby those memory areas reserved for the computer status data must also be formatted.

In the inventive procedure, the memory area to be secured can be defined by permanently programmed data interfaces, that is, by pointers to data structures, so that expansions of the required memory space are also always implemented under central control.

Due to the strict control of the computer status data memory area, it is also possible to edit the computer status data secured by transfer in readable form. The secured information, is generally binary and thus is not readable. In an advantageous development, the computer status data is therefore again read and edited from the external data carrier, for example the disk, after a successful start-up and is thereby brought into a readable, symbolic form. The error search and analysis can then be implemented on the basis of this edited data. The edited data can in turn be stored on a data carrier, for example, on the hard disk, and is also available in this case for a potential, later error analysis or an error logging. The data editing function, however, need not necessarily occur in the computer online but can also ensue offline.

In the inventive method the transfer function is offered on a level below the operating system and allows an effective securing of the relevant computer status data (error indices) in an acute, serious malfunction with maximum time optimization. The current situation at the time of the malfunction is thus displayed with the secured, potentially edited computer status data, so that the error can be quickly analyzed and localized.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts computer status data to be secured in the form of a table;

FIG. 2 is a flow chart of the transfer function given a malfunction of the main platform;

DESCRIPTION OF THE PREFERRED EMBODIMENTS

Figure 3:
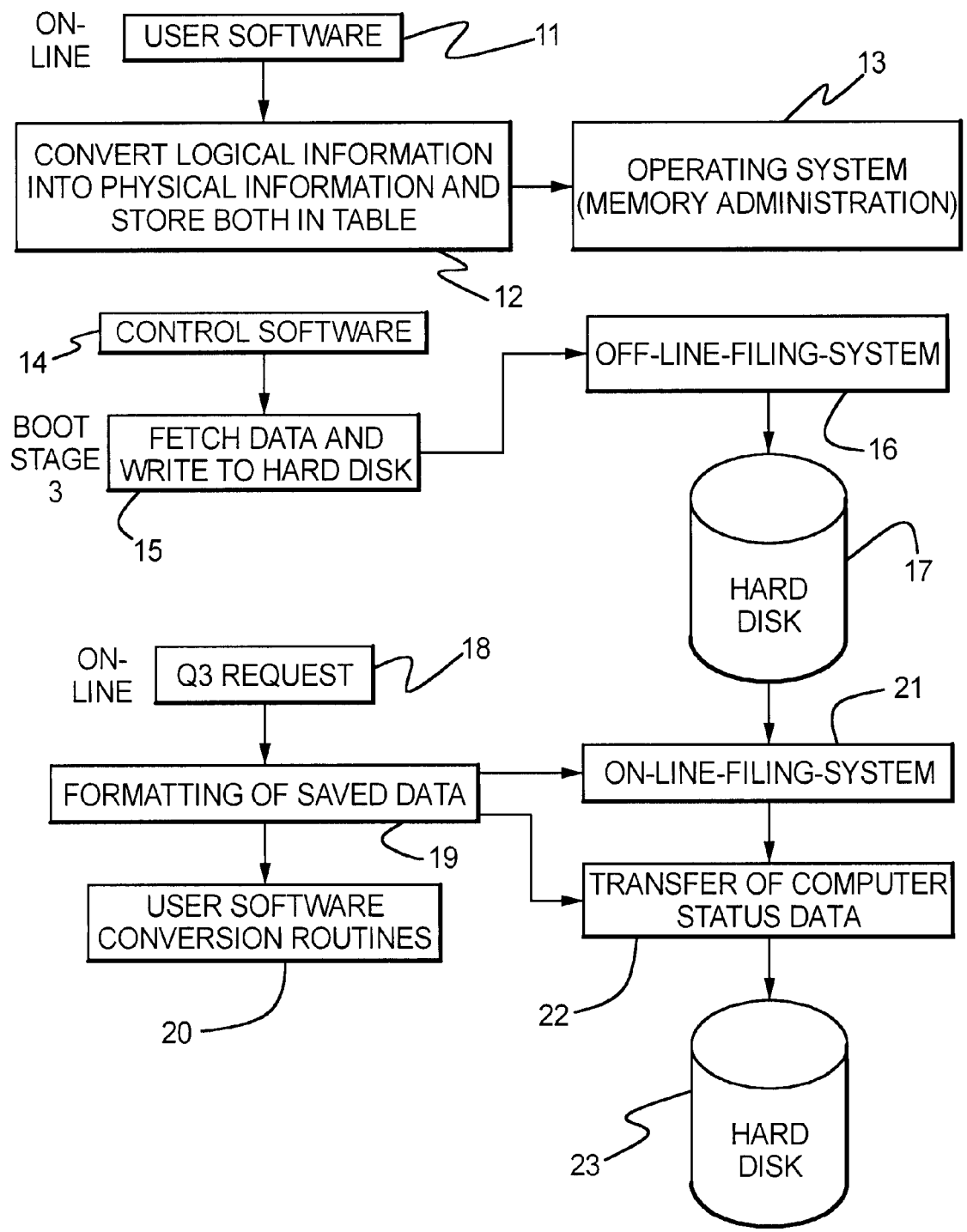
FIG. 3 depicts interfaces and function units for the storing of computer status data at the main platform.

Computer status data, that is, data employable as error indices given malfunctions in fail-safe systems, are continuously stored in a main memory (not shown) of the computer unit (processor unit) given the inventive method. Such computer units, for example, can be a main platform (primary main processor controller MP-SA) and/or of dependent platforms (dependent main processors MP-D) that, in particular, are utilized in electronic switching systems for telecommunications switching. The present invention, however, can also be applied given other systems and also allows an immediate restarting of a computer unit after a crash given such other systems or an error that can be eliminated only by restarting the system without having the status data, that is continuously written and that records the computer status up to the crash, being lost. The continuously registered computer status data (error indices, see the left-hand column), including their approximate size (second column), their location; main platform MP-SA or dependent platform MP-D (middle column) the startup stage during which the data are overwritten in the main memory (fourth column) and a short explanation of their significance (fifth column) are shown in the attached FIG. 1 in the form of a table. The computer status data is continuously registered in the form of a table and being relocated given a restart of the computer before the loading of the operating system. In a modified embodiment, however, additional data or not all data recited in Table 1 can also be acquired and transferred given a malfunction. Since Table 1 is self-explanatory, further explanations with respect thereto are superfluous.

The inventive transfer function, wherein the computer status data is transferred from the main memory onto an external data carrier, is implemented whenever a startup stage with partial or complete formatting of the main memory must be implemented. When different start-up stages are present, whereby at least one lies on a higher level and requires no reformatting of the main memory with loading of the operating system, an inventive decision is made as to whether the startup stage to be implemented is linked with a (selective or complete) reformatting of the main memory. The transfer function is only implemented when it is determined that a startup stage having at least partial reformatting of the main memory is to be implemented. To this end, the transfer function is preferably deposited in a basic program level that is processed given a restart with renewed loading of the operating system, namely still before the loading of the operating system.

The inventive transfer function effecting the transfer of the relevant computer status information from the main memory onto the external data carrier requires information about the address and the length of the data in the main memory to be secured. Insofar as different programs working on different interrupt levels, for example supervisor software and user software, are present, the transfer function can offer two interface procedures that are correspondingly called given a restart. Insofar as the address is offered by the user software and only present in logic format due to the internal system design, the transfer function converts this data into the corresponding physical domain in that a corresponding conversion program routine is called, for example, an operating system interface.

FIG. 2 shows the executive sequence of the data transfer given a main platform MP-SA of an electronic switched system. Before a restart of the processor (step 1) caused by malfunction, computer status data from the user software and the other components are continuously written into the main memory of the main platform and a corresponding particular about memory address and area length is continuously updated. Given the startup stage leading to a reformatting of the main memory (step 1), an access to the computer status data of the main memory is implemented in a step 2 before the loading of the operating system and this computer status data is stored on the hard disk in a step 3. Subsequently, the normal operating mode is achieved again in a step 4 on the basis of the startup of the computer.

So that the secured computer status data indicating the computer status at the occurrence of the serious fault can be evaluated for an error analysis and, potentially elimination, a data conversion procedure is preferably provided that, for example, is called by a Q3 request of a basic terminal BCT (basic craft terminal; step 5). As a result of this request, the processor is initiated to read the secured computer status data from the hard disk, to identify the data and to call the corresponding conversion routine for each data type (steps 7, 8). The correspondingly edited, formatted data are then rewritten on the disk via the Q3 interface and into a separate data file (steps 9, 10). This data file can be read out via a Q3 request for a data analysis or the like. The output data file can then be transferred to the operating system, for example to the telecommunications management operating system.

In the present embodiment, the above-explained data conversion control process is provided only on the main platform, so that the main platform is accessed for editing secured computer status data that derive from other computer units, for example from dependent platforms.

The data conversion control process can be undertaken and called by the respective user himself, particularly via the Q3 request.

FIG. 3 shows the interfaces and function units for the computer status data registration and transfer in the form of a diagram. During normal computer operation, logical addresses of the data to be potentially secured later are made available in the program processing, for example by the user software 11, this data being converted into physical addresses by the conversion function 12 representing a component part of the inventive method. Both the logical as well as the physical information (addresses) are then stored in the table in the main memory.

Given a restart of the computer caused by a serious malfunction, the data is read from the main memory in a boot stage, for example the boot stage 3 (block 15), and is stored onto the hard disk 17 with the assistance of a system 16 for offline filing.

After a successful restart, a call of the computer status data stored on the hard disk 17 and a formatting thereof by calling conversion routines (blocks 19 and 20) can again be implemented online via a Q3 request (block 18). The converted, formatted data can be written back onto the hard disk 17 via an online filing system 21 or can be stored on a hard disk 23 via a transfer routine 22. In the inventive method, all relevant information, for example the physical and logical addresses, are stored in an internal table in the main memory, whereby the table is arranged at a specific physical address. As a result thereof, it is assured that the table, that is, the information, can be read given restart of the computer (for example, at the boot level 3 in the ultimative main platform or, respectively, in the boot level 2 in the dependent platform). Given such a startup stage that contains at least partial formatting of the main memory, the data is transferred via the offline filing system 16 into a separate data file on the hard disk 17 when the main platform is restarted after a malfunction.

Figure 4:
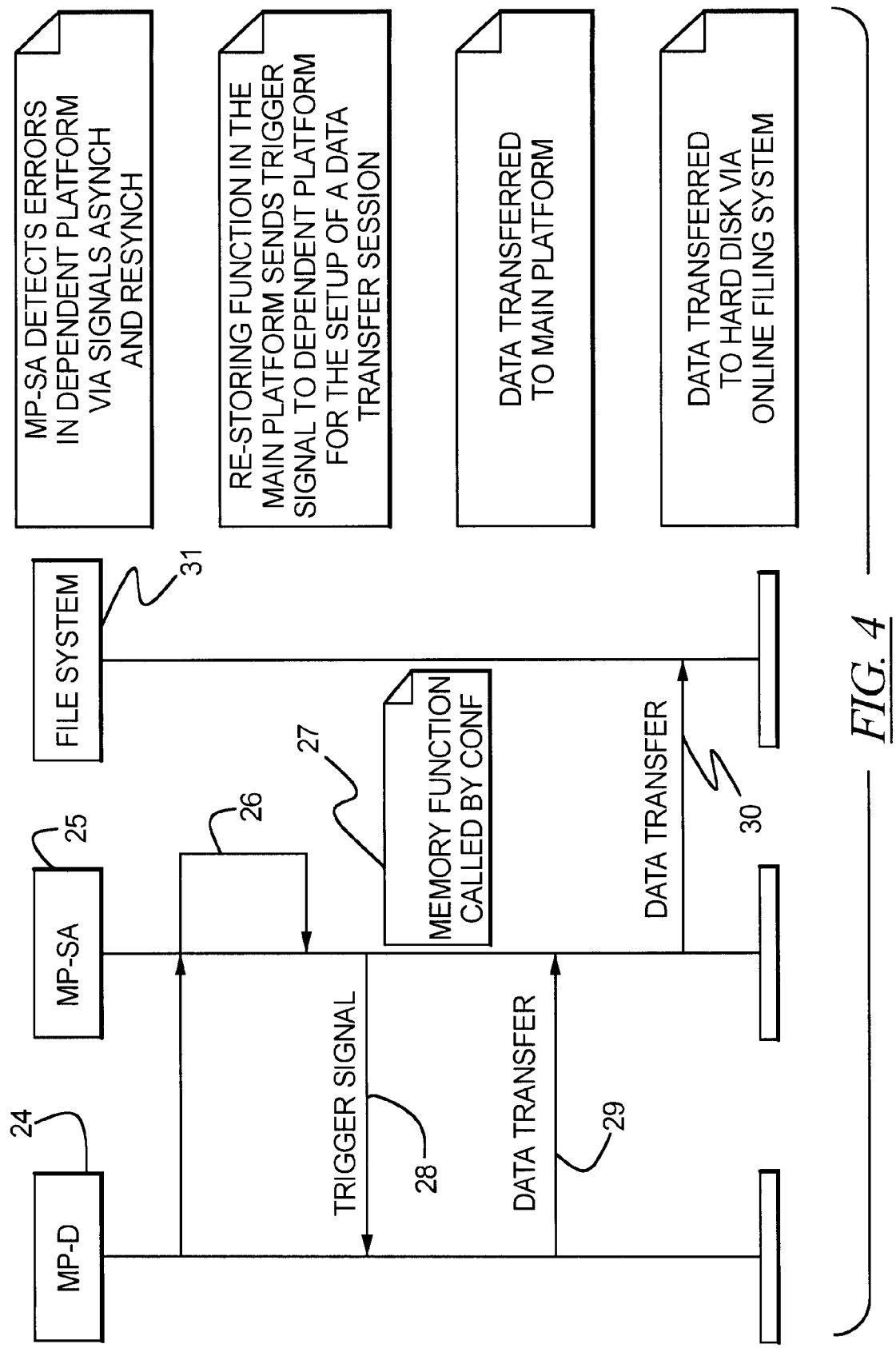
FIG. 4 depicts the executive sequence of the data storing and transfer given a malfunction of a dependent platform.

FIG. 4 shows the executive sequence of the transfer function in a dependent platform MP-D. When a malfunction occurs in a dependent platform 24 that requires a restart with the new loading of the operating system, this is recognized by the main platform 25 on the basis of the signals Resynch failing to arrive from the dependent platform 24, being recognized with a routine HWFP 26 (hardware error processing). When the main platform 25 subsequently makes the decision for re-activation, that is, for restart of the dependent platform 24, a configuration administration program CONF in the main platform is started, this serving the purpose of restarting the dependent platform 24. The program CONF 27 then effects the transmission of a trigger signal 28 to the dependent platform 24 in order to thereby initiate the data transfer 29 from the main memory of the dependent platform 24 to the main platform 25. The program CONF thus calls the transfer function for transferring the computer status data that are transferred from the main memory of the platform 24 to the main platform 25 in the data transfer step 29. As a result of the interconnected memory area of the main memory of the platform 24 that is clearly defined by the address pointer in the area length, this data transfer is quickly concluded, so that the activation of the dependent platform 24 is not delayed to a noteworthy extent.

The inventive transfer function in the dependent platform 24 is thereby called by the trigger signal 28, whereby the main platform 25 serves as external data carrier in this case. Subsequently, these computer status data that are initially stored in the main memory of the main platform 25 and indicate the hardware and software condition of the dependent platform 24 before and at the malfunction are secured in a transfer step 30 onto a hard disk with an online filing system 31. Due to the program CONF 27, the inventive transfer function is initiated in all automatic activations of the dependent platforms 24. When, however, a reset in a dependent platform 24 was triggered by voltage interruption at the dependent platform 24, there is a risk that the memory content of the dependent platform is disturbed. In this case, therefore, no data is preferably accepted from such a dependent platform.

After the conclusion of the data transfer, the main memory of the appertaining computer unit can be selectively or completely formatted without this exerting negative influences on the error analysis and illumination.

If data from more than one dependent platform 24 are to be simultaneously secured, the computer status of data of only that dependent platform whose transfer function was called first are initially secured. All other requests in view of a transfer are rejected until the sequencing transfer procedure has ended. The computer status data of other platforms to be started are then successively secured after the conclusion of the first transfer procedure.

For facilitating the automatic processing and the transfer of the data to be secured, it can preferably be provided in the operating system that the data files into which the secured data are written are provided with appropriate, system-matched data file names. It can thereby be provided, that a maximum of four data files for secured computer status data are formed for the main platform, whereas a maximum of eight data files are provided for the dependent platforms. In the inventive method thus, the computer status data (symptoms or error indices) can thus not only be stored in a data carrier that is not reformatted given a restart but can also be converted into a format that is suitable for a user input/output (user I/O).

Further, the computer status data can also contain information about all important peripheral devices, for example about their operating condition. Further, the following computer status data are preferably stored given recognition of software errors: module name, software error number, startup level, interrupt address, processor name and last active process.

The computer status data also contains the security area for the software error handling SWET. This area contains all error messages that were reported in software error messages, stated more precisely all communicated software error information that, however, have not yet been secured in an error message data file.

Further, system monitoring data can be stored given real-time errors. Over and above this, error registrations (symptom data registrations) can be contained in the error status data insofar as these were not yet stored in a separate security measures data file but also remains undamaged given restart of the computer. Further, the computer status data can contain relevant information about the current and the most recent startup and/or error indices in the most recent startup events. Further, a hardware communication area can likewise be contained in the computer status data, so that this is likewise secured by the inventive transfer function.

All error messages that themselves do not in turn lead to a startup of the computer can also be counted among the computer status data that are shown in FIG. 1. These error messages also contain statements about the statuses of the peripheral devices. Two tables can thereby be provided, whereby only the error messages given the current malfunction are contained in one table. This information is only secured when a complete outage of the periphery is registered. The error messages that had occurred given earlier malfunctions are stored in the further table.

The computer status data can also contain central configuration data about the individual statuses of the central units.

If, for whatever reasons, it is not possible to transfer the computer status data onto the hard disk upon startup of the computer, corresponding information can instead be stored in the communication area and can be output at the end of the startup.

The display of the error messages on a monitor and the writing onto the fixed disk can be implemented upon employment of the BIOS system. As a result of the inventive transfer, delays that would occur given utilization of a process communication can thereby also be avoided.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for storing a computer status data characteristic of a status of a computer given a malfunction that requires a subsequent restart of the computer, comprising the steps of:
   continuously storing and registering the computer status data in a main memory of the computer; and,
   reading, given a restart of the computer, the computer status data in the main memory before formatting the main memory and transferring via a transfer function the computer status data onto a data carrier.

2. The method according to claim 1, wherein the transfer function is called by running a boot strap function.

3. The method according to claim 1, wherein, for access to the computer status data, a start address and an extent of the area of the main memory containing said computer status data are indicated.

4. The method according to claim 1, wherein the computer status data transferred onto the data carrier and present in binary form is edited and brought into a readable, symbolic form.

5. A method for storing a computer status data characteristic of a status of a computer given a malfunction that requires a subsequent restart of the computer, comprising the steps of:
   continuously storing the computer status data in a main memory of the computer; and,
   reading, given a restart of the computer, the computer status data in the main memory before formatting the main memory and transferring via a transfer function the computer status data onto a data carrier;
   wherein a check is carried out given restart of the computer after a malfunction to determine if a start level contains a reformatting of the main memory and the transfer function is not called given a startup without reformatting of the main memory.

6. The method according to claim 1, wherein the computer status data contains at least one of: reset requests that were generated by hardware components or software components; information about requests of a software error processing; requested startup stage and/or diagnosis results with respect to the computer unit and the hard disk.

7. A method for storing computer status data characteristic of a status of a computer given a malfunction that requires a subsequent restart of the computer, comprising the steps of:
   continuously storing the computer status data in a main memory of the computer;
   determining, given restart of the computer after a malfunction, if a start level contains a reformatting of the main memory; and
   reading, given restart of the computer and only if the main memory is to be reformatted, the computer status data in the main memory before formatting of the main memory, and transferring the computer status data onto a data carrier.

8. The method according to claim 7, wherein the transfer of data is effected by running a boot strap function.

9. The method according to claim 7, wherein, for access to the computer status data, a start address and an extent of the area of the main memory containing said computer status data are indicated.

10. The method according to claim 7, wherein the computer status data transferred onto the data carrier and present in binary form is edited and brought into a readable, symbolic form.

11. The method according to claim 7, wherein the computer status data contains at least one of: reset requests that were generated by hardware components or software components; information about requests of a software error processing; requested startup stage and/or diagnosis results with respect to the computer unit and the hard disk.

12. A method for storing computer status data characteristic of a status of a computer given a malfunction that requires a subsequent restart of the computer, comprising the steps of:
   continuously storing the computer status data in a main memory of the computer, the computer status data containing at least one of reset requests that were generated by hardware components or software components, information about requests of a software error processing, requested startup stage and diagnosis results with respect to the computer unit and the hard disk; and
   reading, given restart of the computer, the computer status data in the main memory before formatting of the main memory and transferring the computer status data onto a data carrier in response to execution of a boot strap function.

13. The method according to claim 12, wherein, for access to the computer status data, a start address and an extent of the area of the main memory containing said computer status data are indicated.

14. The method according to claim 12, wherein the computer status data transferred onto the data carrier and present in binary form is edited and brought into a readable, symbolic form.

15. A method for storing computer status data characteristic of a status of a computer given a malfunction that requires a subsequent restart of the computer, comprising the steps of:

continuously storing the computer status data in a main memory of the computer, the computer status data containing at least one of reset requests that were generated by hardware components or software components, information about requests of a software error processing, requested startup stage and diagnosis results with respect to the computer unit and the hard disk; and reading, given a restart of the computer, the computer status data in the main memory before formatting the main memory and transferring the computer status data onto a data carrier in response to execution of a boot strap function;

wherein a check is carried out given restart of the computer after a malfunction to determine if a start level contains a reformatting of the main memory and the transfer of data is not effected given a startup without reformatting of the main memory.

* * * * *